Jan. 21, 1936.  D. W. HUDSON  2,028,330
VENTILATED AND HUMIDIFIED STORAGE RECEPTACLE
Filed Feb. 3, 1933
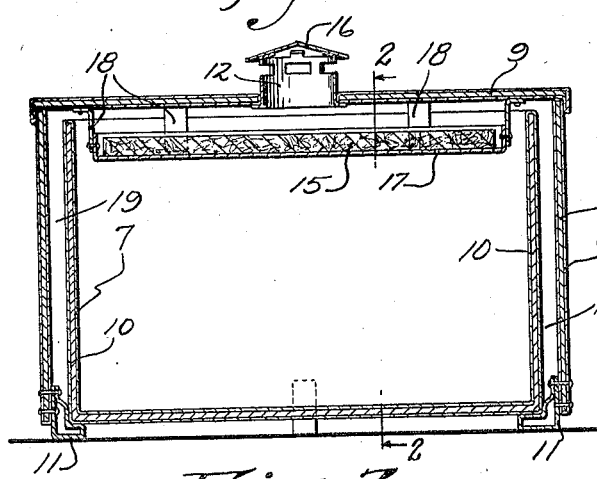
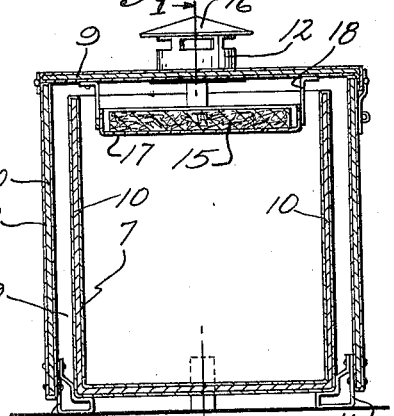
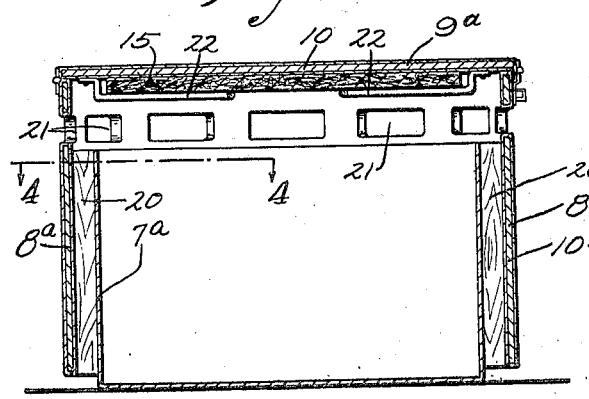
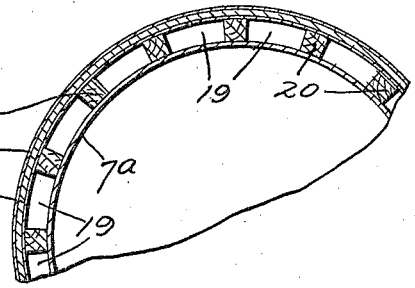

Patented Jan. 21, 1936

2,028,330

UNITED STATES PATENT OFFICE 2,028,330

VENTILATED AND HUMIDIFIED STORAGE RECEPTACLE

David W. Hudson, Green Bay, Wis.

Application February 3, 1933, Serial No. 655,004

6 Claims. (Cl. 45—133)

This invention relates to improvements in ventilated and humidified storage receptacles.

It is the primary object of the invention to provide a novel and improved means for the safe-keeping over considerable periods of time of a wide variety of living and nonliving materials which require air circulation and humidity for their well being. Cake is ordinarily regarded as a very perishable matter. Even where kept in a substantially tight container, the cake dries out and its frosting hardens, the result being that the cake is inedible within a few days. Attempts have been made to supply moisture to a cake stored in a tight container and the result, at least in warm places, is almost inevitably mildew and mold. By means of the present invention which provides for a non-mechanical circulation of humidified air, a cake may be kept fresh, soft and edible over a period of months.

By way of exemplifying a widely different use of my invention, I may refer to the fact that fishing worms soon become sluggish and shortly thereafter die when kept for a few days in the ordinary bait box. When kept in a container embodying the present invention they retain their activity and remain alive for much longer periods of time than are required in practice.

Specifically stated, it is my purpose to employ a humidifying means not only to condition the air within the container, but also to accelerate its circulation through the container, whereby the combined advantages of humidity and fresh air are made effective upon the contents of the container.

The drawing shows various types of containers employed for a variety of purposes and disclosing various possibilities as to construction.

Figures 1 and 2 respectively represent longitudinal and transverse sections through one type of container embodying the invention as indicated by the lines 2—2 and 1—1, respectively.

Figure 3 represents a longitudinal section, and Figure 4 a fragmentary horizontal section substantially on the line 4—4 of Fig. 3 through a different embodiment of the invention.

Like parts are identified by the same reference characters throughout the several views.

In general, I prefer that my improved containers should have spaced inner and outer walls providing air passages. In the several embodiments of the invention herein disclosed this objective is achieved through an arrangement whereby complete inner receptacles 7 and 7a are provided for the articles to be stored and spaced within outer receptacles or shells 8 and 8a having covers 9 and 9a through which the contents of the receptacles 7 and 7a are made accessible.

In the construction shown in Figs. 1 to 4, the walls of the outer shell are made double and filled with a thermal insulating material 10. The cover is likewise made to comprise a double wall and filled with the same material. In the Figs. 1 and 2 construction the inner receptacle also has a double wall, the interior space of which is filled with a thermal insulator. The insulating material 10 may comprise fiber board, cork, cloth, or any other of the numerous compositions or fabrics available for the performance of this function.

In the construction shown in Figs. 1 and 2, the inner receptacle 7 and the shell 8 are spaced by the feet 11 which serve as supports for the apparatus. These feet allow the air to circulate under receptacle 7 and all about its sides. The cover 9 is provided with a vent fitting 12 through which air entering the space between the walls of the apparatus may escape.

All of the air in the device is subjected to the humidifying action of a moistened pad 15 to which water may be supplied by removing the cover 16 of the vent attachment 12. The pad is supported in a pan 17 which is of large area but spaced from the side walls of the receptacle 7. The pan may be supported in any desired manner, but is preferably attached in spaced relation to cover 9 by straps 18 which permit freedom of air circulation about the pad 15.

The air in the device, being made lighter by the admixture of water vapor therewith, tends to escape constantly through the apertures in the vent fitting 12, and is replaced by fresh air admitted through the spaces 19 between the walls of receptacle 7 and shell 8. The constant evaporation of water requires heat, which is absorbed from the receptacle 7 and its contents. An influx of heat by radiation from the outside of the device is prevented by the thermal insulation 10. As a result, the contents of the receptacle are maintained subject to humidity in excess of that outside of the device, through a constant circulation of fresh air which, although slow, prevents mold, and to a temperature which is reduced as compared with that outside of the device.

The contents of receptacle 7 are instantly accessible since, when the cover 9 is raised, the humidifying pad 15 will be raised with it. Furthermore, it will be noted that the receptacle 7 merely rests loosely upon the feet 11 and hence is freely removable for washing or for the packing or removal of its contents.

In the construction shown in Figs. 3 and 4, the receptacle 7a and the shell 8a are maintained in spaced relation by spacers 20 disposed at intervals about the cylindrical wall of receptacle 7a. In this instance the receptacle itself comprises a base and the shell is supported therefrom by the spacers 20.

Instead of having a vent fitting in the cover 9a, this device is so formed that there are vent apertures 21 in a portion of the shell which extends above the receptacle 7a. The pad 15 is held by clips 22 tightly against the under surface of the cover 9a in a position where the vapor pressure developed by its contained moisture may readily humidify the air in receptacle 7a and induce a flow upwardly through the passages 19 and out through ports 21.

While there are a wide variety of forms in which my invention may be embodied, the foregoing exemplifications will illustrate several of the possibilities.

I claim:

1. In a device of the character described, the combination with a receptacle and a shell having walls spaced from said receptacle, and a cover spaced above said receptacle, the space within the walls comprising an air inlet and the upper portion of said shell being vented to provide an air outlet, of a pad disposed above the receptacle, and means connecting said pad with the cover whereby the contents of the receptacle are accessible upon removal of the cover.

2. A device for the preservation of perishable material, which device comprises an open mouthed receptacle for the material, a housing having portions spaced from the receptacle to provide an air passage across the mouth of the receptacle, said housing having air inlet and outlet openings communicating with said passage, and a water absorbent pad at the mouth of said receptacle and exposed to said passage, said receptacle having a restricted communication with said passage about said pad, said pad being adapted to humidify the air in said passage to increase the vapor pressure in the mouth of the receptacle and to induce circulation of air through said passage outside of said receptacle.

3. In a device of the character described, the combination with an open mouthed receptacle and a shell, said receptacle and shell having mutually spaced walls providing an air passage, of a cover movable to and from a closed position above said receptacle, said air passage being vented at the top and bottom of said shell, and a water retaining pad disposed adjacent the mouth of said receptacle and having its lower surface exposed to air about said mouth, said pad being adapted to humidify the air of said receptacle and the air in said passage.

4. The combination with a receptacle having a bottom, side walls, and an open mouth, of a surrounding shell having walls supported by and spaced laterally from those of said receptacle to provide air passages open at the bottom, a cover for said shell and receptacle in spaced relation to the mouth of said receptacle, whereby said receptacle is in communication with said passages, means venting said passages at the top adjacent said mouth, bracket means movable to permit access to said receptacle, and a water absorbent pad mounted in said bracket means at least partially across the mouth of the receptacle and comprising means for humidifying the air to increase the vapor pressure at the mouth of said receptacle and induce air flow through said passages.

5. In a device of the character described, the combination with a receptacle and a surrounding shell having mutually spaced walls providing an air passage therebetween, of supporting means for said shell providing a seat on which said receptacle is removably mounted, said air passage being open adjacent the bottom of said receptacle and shell and vented at the top thereof, and said receptacle having an open mouth communicating with said passage, and humidifying means exposed to the air in said passage, the interior of said receptacle being in communication with said passage but removed from the direct path of air circulation from the bottom of the shell to the vent.

6. In a device of the character described, the combination with a receptacle and a surrounding shell having mutually spaced walls providing an air passage therebetween, said air passage being opened adjacent the bottom and top of said receptacle and shell, and said receptacle having an open mouth communicating with said passage, a cover movable to and from closed position above the open mouth of said receptacle, means thermally insulating a portion of said shell, and a water absorbent pad operatively connected to the under side of said cover to receive support therefrom and to move unitarily therewith, the contents of said receptacle being directly exposed through the open mouth thereof beneath said pad, and said pad comprising means for humidifying said receptacle, cooling the contents thereof, and inducing air flow through said passage.

DAVID W. HUDSON.